June 18, 1963 A. WARTELLA 3,094,632
EXCLUSIVE-OR TRANSISTOR LOGIC CIRCUIT
Filed May 24, 1960
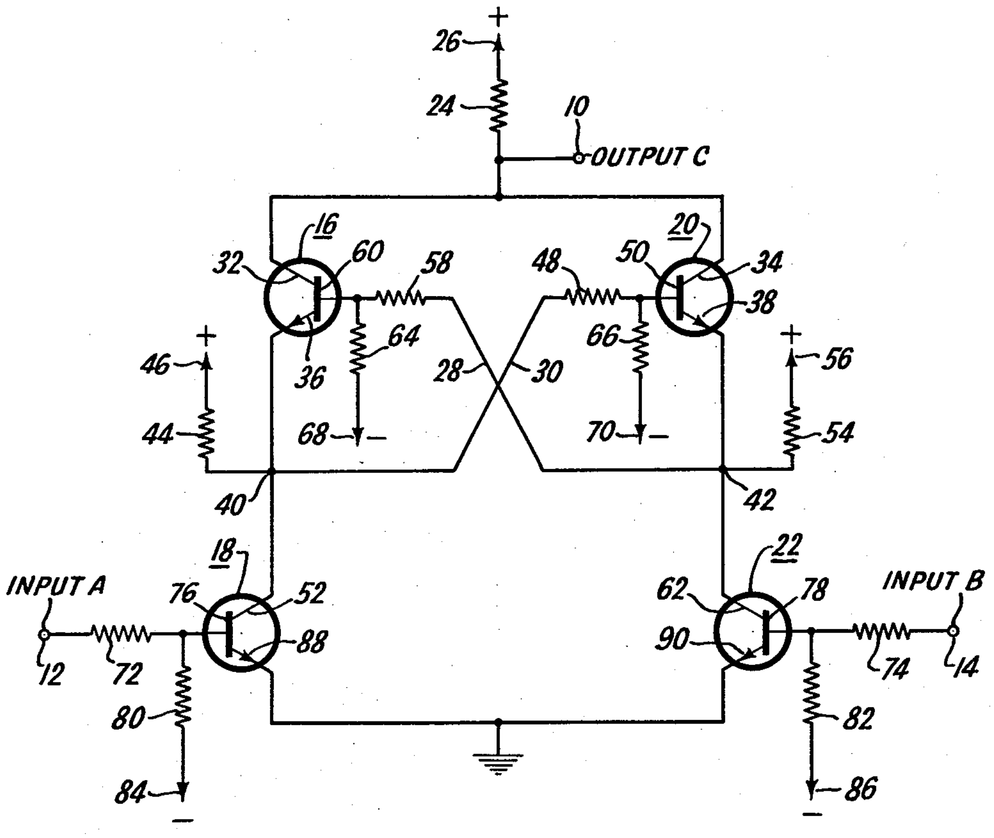
INVENTOR
ANDREW WARTELLA
BY F. D. Sullivan
ATTORNEY United States Patent Office 3,094,632
Patented June 18, 1963

3,094,632
EXCLUSIVE-OR TRANSISTOR LOGIC CIRCUIT
Andrew Wartella, Cheektowaga, N.Y., assignor to Sylvania Electric Products Inc., a corporation of Delaware
Filed May 24, 1960, Ser. No. 31,452
1 Claim. (Cl. 307—88.5)

This invention is concerned with electronic data processing systems, and particularly with sum-modulo-two adders useful in such systems.

Sum-modulo-two addition may be described as addition without carry of binary numbers. Thus, in modulo-two adders an output signal occurs in response to an odd number of signal inputs, and there is no output signal if the number of input signals is even. This relationship may be represented by the following equations (where the symbol $\oplus$ represents modulo-two addition):

(I) $A\oplus\bar{B}=C$
(II) $\bar{A}\oplus B=C$
(III) $A\oplus B=\bar{C}$
(IV) $\bar{A}\oplus\bar{B}=\bar{C}$ These equations indicate that there is an output signal at C if there is an input signal at A and none at B (I), or at B with none at A (II), and also, that there is no signal output at C if there are signal inputs at both A and B (III), or no signals inputs at A and B (IV).

In electronic data processing, such adders are frequently employed to convert divers signal pulses into meaningful information. For example, co-pending U.S. patent application Ser. No. 842,549, of M. G. Nicholson and R. A. Smith, filed September 24, 1959, discloses, for digital communications systems, an error corrector in which an algebraic network comprised of modulo-two adders performs a summation of received digits to correct erroneously transmitted digits of a binary coded message.

A conventional flip-flop circuit with a complementing input is a simple and efficient modulo-two adder. Such a circuit produces a "1" output whenever the number of complementing signals applied to its input is odd and a "0" output when the number of such input signals is even. It is, however, limited to use with serially applied input signals and is not adapted to process coincident complementing inputs. Consequently, when modulo-two adders have been required to operate with coinciding input signals, it has been necessary to employ more complicated circuits involving such devices as magnetic cores with criss-crossed inhibit windings, inverter-AND gate combinations, transformers with opposing inputs to their primary windings, etc., or to delay one of the inputs to a complementing flip-flop. Such devices have been relatively complicated in structure, expensive, and unreliable or slow in operation.

Accordingly, a principal object of this invention has been to provide an improved sum-modulo-two adder and, more specifically, one which is immediately responsive to input signals, relatively simple in structure, and reliable in operation when employed with simultaneous inputs.

These and related objects are accomplished in one illustrative embodiment of the invention by using a unique configuration of cross-connected transistors to provide an output signal when one, and only one, of two signal input channels has been energized. Each of the two input channels is capable of de-energizing the other, thereby giving the circuit the capability of providing an output signal if only one input is energized and no output signal if both, or neither, are energized.

Other objects, embodiments, modifications, and features of the invention will be apparent from the following description of the sum-modulo-two adder illustrated in the accompanying drawing.

The adder of the drawing is arranged to indicate at a first terminal 10 an output signal C indicative of modulo-two addition performed upon signals arriving coincidentally at terminals 12 and 14 and representing first and second inputs A and B, respectively. This circuit includes first and second transistors 16 and 18 connected, emitter of one to the collector of the other, to form a first AND gate in the sense that a signal is produced at terminal 10 when both transistors are conducting and none if only one is conducting, and third and fourth transistors 20 and 22 similarly connected to form a similar second AND gate. These gates are connected in an OR configuration between a load resistor 24 and ground potential. Resistor 24 is connected between a first current source 26 and output terminal 10. Each of the AND gates has an INHIBIT connection, via cross-connections 28 and 30 to the other. Thus, when one is energized it automatically disables the other; and, when both are energized, they are mutually disabled.

The collectors 32 and 34, respectively, of transistors 16 and 20 are connected to the common load resistor 24. The emitters 36 and 38, respectively, of these same transistors are connected respectively to terminals 40 and 42. Terminal 40 is connected, through a load resistor 44, to a second current source 46, through cross-connection 30 and an isolating resistor 48, to the base 50 of transistor 20, and directly to the collector 52 of transistor 18. Similarly, terminal 42 is connected, through a load resistor 54 to a third current source 56, through cross-connection 28 and isolating resistor 58 to the base 60 of transistor 16, and directly to the collector 62 of transistor 22.

Transistors 16 and 20 are biased via resistors 64 and 66 which are connected between current sources 68 and 70, respectively, and the base electrodes 50 and 60 of their corresponding transistors 16 and 20. Inputs A and B are connected through isolating resistors 72 and 74 connected to the base electrodes 76 and 78, respectively, of their corresponding transistors 18 and 22. These transistors are biased by connection through resistors 80 and 82 to current sources 84 and 86, respectively. The emitters 88 and 90 of the transistors are connected, in common, to ground potential.

As explained previously, the purpose of this circuit is to provide an output signal C at terminal 10 if there is an input signal A or B at terminals 12 or 14, respectively, and no output signal C if there are inputs at neither terminal 12 nor terminal 14 or if there are simultaneous inputs A and B at these two terminals. This is accomplished in the following manner.

With no input signals at terminals 12 or 14, transistors 18 and 22 are biased to cut off by the potential applied from sources 84 and 86 to their respective base electrodes 76 and 78. Transistors 16 and 20 are also in cut-off condition because they require conductive paths to ground through transistors 18 and 22 which, as has been explained, are in cut-off condition. The net result is that the potential from source 26 is applied, through resistor 24, directly to terminal 10 indicating a no signal condition for output C. This satisfies Equation IV ($\bar{A}\oplus\bar{B}=\bar{C}$) set forth in the introductory portion of this description.

When a positive going input signal A is applied to terminal 12, transistor 18 is rendered conductive. This reduces the voltage at terminal 40 to substantially ground potential and supplies a conductive path for current from source 26 through transistor 16 to ground. Similarly, a signal input B applied to terminal 14 renders transistor 22 conductive and provides a conductive path from source 26 through transistors 20 and 22 to ground. When either of these conductive paths is established, the voltage at terminal 10 is reduced from the level of source 26 to substantially ground potential, thereby providing a signal for output C. This satisfies the Equation I ($A \oplus \overline{B} = C$) and Equation II ($\overline{A} \oplus B = C$).

When transistors 18 and 22 are both rendered conductive by input signals A and B applied simultaneously to their respective base electrodes, the terminals 40 and 42 are both reduced to substantially ground potential. This assures, via cross-connections 30 and 28, that the transistors 20 and 16 in the other channels will be cut off, thereby preventing conduction from source 26 and applying the full potential of this source to terminal 10 to indicate no signal for output C. This satisfies Equation III ($A \oplus B = \overline{C}$).

Thus, the device of the drawing provides a capability for sum-modulo-two addition of input signals A and B applied to terminals 12 and 14 and accomplishes this in a very reliable manner with a minimum of circuitry. Moreover, it provides an output indication as soon as the input signals are applied with no significant delay and avoids the necessity of timing and gating pulses, etc. with their consequent danger of introducing undesirable transients.

The adder of the drawing has operated successfully with the following combination and values of component elements.

| | |
|---|---|
| Transistor **16** | 2N388. |
| Transistor **18** | 2N388. |
| Transistor **20** | 2N388. |
| Transistor **22** | 2N388. |
| Resistor **24** | 680 ohms. |
| Potential at source **26** | +8 v. |
| Resistor **44** | 3K. |
| Potential at source **46** | +8 v. |
| Resistor **48** | 6.2K. |
| Resistor **54** | 3K. |
| Potential at source **56** | +8 v. |
| Resistor **58** | 6.2K. |
| Resistor **64** | 33K. |
| Resistor **66** | 33K. |
| Potential at source **68** | −8 v. |
| Potential at source **70** | −8 v. |
| Resistor **72** | 3K. |
| Resistor **74** | 3K. |
| Resistor **80** | 13K. |
| Resistor **82** | 13K. |
| Potential at source **84** | −8 v. |
| Potential at source **86** | −8 v. |

Although a specific circuit has been shown and described and specific identities and values for circuit elements have been suggested, the invention is not limited to this particular illustrative embodiment but embraces the full scope of the following claim.

What is claimed is:

For the performance of logic functions, an electronic circuit providing a signal response at an output terminal when a signal is applied to either a first or a second input terminal and no such signal response when no signal is applied to either input terminal or simultaneous signals are applied to both of said terminals, said circuit comprising: first and second input terminals and an output terminal; first, second, third and fourth transistors each having collector, base and emitter electrodes; a first current source connected in common to said output terminal and the collector electrodes of said first and third transistors; a point of reference potential connected to the emitter electrodes of said second and fourth transistors; means connecting the emitter of said first transistor to the collector of said second transistor; means connecting the emitter of said third transistor to the collector of said fourth transistor; means connecting said first input terminal to the base electrode of said second transistor; means connecting said second input terminal to the base electrode of said fourth transistor; first and second positive potential terminals; first and second negative potential terminals; a first series of impedance elements connected in a voltage divider arrangement between said first positive and said first negative terminals; a second series of impedance elements connected in voltage divider arrangement between said second positive and said second negative terminals; means connecting at least one of the impedance elements of said first series in series circuit between the base of said first transistor and the collector of said fourth transistor; and, means connecting at least one of the impedance elements of said second series in series circuit between the base of said third transistor and the collector of said second transistor.

References Cited in the file of this patent

UNITED STATES PATENTS

| | | |
|---|---|---|
| 2,901,608 | Paulsen et al. | Aug. 25, 1959 |
| 2,946,897 | Mayo | July 26, 1960 |